(12) United States Patent
Yokohara et al.

(10) Patent No.: US 9,346,314 B2
(45) Date of Patent: May 24, 2016

(54) PIGMENT TRANSFER SHEET FOR FOODS

(75) Inventors: Chieko Yokohara, Kobe (JP);
Katsuhiko Yamada, Kobe (JP)

(73) Assignee: OCI Co., Ltd., Kobe-shi (JP)

( * ) Notice: Subject to any disclaimer, the term of this patent is extended or adjusted under 35 U.S.C. 154(b) by 718 days.

(21) Appl. No.: 13/375,775

(22) PCT Filed: May 28, 2010

(86) PCT No.: PCT/JP2010/059115
§ 371 (c)(1),
(2), (4) Date: Dec. 2, 2011

(87) PCT Pub. No.: WO2010/140550
PCT Pub. Date: Dec. 9, 2010

(65) Prior Publication Data
US 2012/0076902 A1  Mar. 29, 2012

(30) Foreign Application Priority Data
Jun. 3, 2009  (JP) ................................. 2009-134216

(51) Int. Cl.
*A23L 1/27* (2006.01)
*B44C 1/17* (2006.01)
(Continued)

(52) U.S. Cl.
CPC ... *B44C 1/17* (2013.01); *A23L 1/00* (2013.01); *A23L 1/0064* (2013.01); *A23L 1/01* (2013.01); *A23L 1/275* (2013.01); *A23L 1/2751* (2013.01); *A23L 1/2753* (2013.01); *A23L 1/2756* (2013.01); *A23L 1/3103* (2013.01); *A23L 1/31445* (2013.01); *A23L 1/32* (2013.01)

(58) Field of Classification Search
CPC ....... B44C 1/17; A23L 1/2756; A23L 1/2753; A23L 1/2751; A23L 1/275; A23L 1/27; A23L 1/00; A23L 1/3103; A23L 1/31445; A23L 1/32; A23L 1/0064; A23L 1/01
USPC ........................................ 426/250, 540, 531
See application file for complete search history.

(56) References Cited

U.S. PATENT DOCUMENTS 5,032,416 A  *  7/1991  Niaura et al. ................. 426/383
5,374,457 A  *  12/1994  Juhl ................... A22C 13/0013
426/129

(Continued)

FOREIGN PATENT DOCUMENTS

EP  0408164 A2  1/1991
JP  53-118545  10/1978
(Continued)

OTHER PUBLICATIONS

International Search Report issued in PCT/JP2010/059115, dated Aug. 17, 2010.

*Primary Examiner* — Anthony Weier
(74) *Attorney, Agent, or Firm* — Birch, Stewart, Kolasch & Birch, LLP

(57) ABSTRACT

An object of the present invention is to efficiently dispose a good coloring layer without any pigment bleeding/irregularity on the surface of the food product during cooking a meat product.
The present invention provides a pigment transfer sheet for foods having a heat-resistant and water-resistant substrate and a transferable transfer coloring layer disposed on the substrate, wherein the transfer coloring layer contains a water-soluble pigment and at least one binder.

4 Claims, 1 Drawing Sheet

(51) Int. Cl.
*A23L 1/275* (2006.01)
*A23L 1/00* (2006.01)
*A23L 1/31* (2006.01)
*A23L 1/314* (2006.01)
*A23L 1/32* (2006.01)
*A23L 1/01* (2006.01)

(56) References Cited

U.S. PATENT DOCUMENTS

| | | |
|---|---|---|
| 5,733,638 A | 3/1998 | Tsukioka |
| 2004/0258862 A1* | 12/2004 | Arias Lopez ............... 428/34.8 |
| 2008/0302470 A1* | 12/2008 | Sumita et al. ................ 156/241 |

| | | | |
|---|---|---|---|
| 2009/0214722 A1* | 8/2009 | Henze-Wethkamp et al. | ............................ 426/105 |

FOREIGN PATENT DOCUMENTS

| | | | |
|---|---|---|---|
| JP | 63-296655 | A | 12/1988 |
| JP | 3-22683 | U | 3/1991 |
| JP | 5-42966 | A | 2/1993 |
| JP | 7-231756 | A | 9/1995 |
| JP | 2000-139401 | A | 5/2000 |
| JP | 2001-11355 | A | 1/2001 |
| JP | 2005-87101 | A | 4/2005 |
| JP | 2005-137282 | A | 6/2005 |
| JP | 2008-143992 | A | 6/2008 |
| JP | 4218743 | B1 | 11/2008 |

* cited by examiner

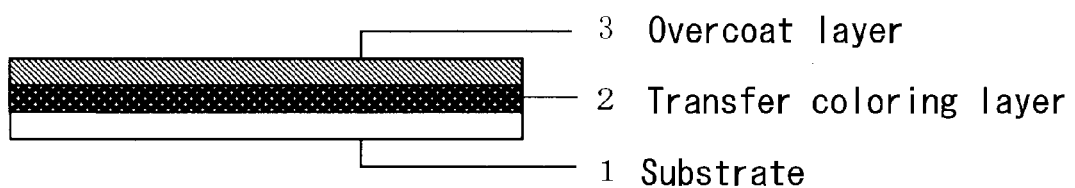

PIGMENT TRANSFER SHEET FOR FOODS

TECHNICAL FIELD

The present invention relates to a pigment transfer sheet for foods comprising an ink from an edible ingredient, and a heat-resistant and water-resistant substrate. The pigment transfer sheet for foods is transferred on a food product surface to color the food product in the process of manufacturing a processed meat product such as roasted pork, a sausage, bacon or ham.

BACKGROUND ART

A caramel pigment can be obtained by subjecting an edible carbohydrate such as starch hydrolysate, syrup or saccharide to heat treatment, to heat treatment with an acid or an alkali, to heat treatment with a sulfurous acid compound and/or an ammonium compound, or to heat treatment with said compounds and an additional acid or alkali. The caramel pigment thus obtained is easily dissolved in water and shows blackish brown. A caramel is widely used as a coloring agent for food products, and is adhered on the surface of a food product to color it to improve the commercial value of the processed food product. For processed meat food products such as roasted pork, a sausage, bacon and ham, the caramel pigment is used to color their surfaces, thereby making the appearance of the products better so that they appear delicious and awakes consumers' desire.

In addition to the caramel pigments, there are water-soluble pigments such as cacao pigments, beet pigments, safflower pigments, gardenia pigments, kaoliang pigments and onion pigments, which are used in food products such as processed meat products, processed marine products, beverages and confectionery. Conventionally, in order to apply a water-soluble pigment such as a caramel pigment to the surface of such a processed meat or fish meat product, coloration is carried out by, for example, adhering or spraying the caramel pigment solely or with a liquid sauce to the surface.

However, said coloring method has a defect that a water-soluble pigment such as a caramel pigment may be dissolved in water generated from a food product during cooking or in sauce, and hardly provides a uniformly colored food product.

A pigment transfer sheet for foods using a caramel pigment easily brings stickiness to make blocking. In the process that a food product is wrapped with a sheet or a cylindrical package material having an inner pigment layer, which is filled with the food product, and then transfer of the caramel pigment is performed by cooking with heat, the caramel pigment is dissolved in water from the food and cannot colored uniformly.

Patent Literature 1 (Japanese Patent Laid-Open No. 2005-137282) as described below shows a method in which a vegetable dry powder is added to glutinous rice and rice to produce an edible ink, and the edible ink is printed on a plastics film to transfer it to a food product. While the literature describes that a color is difficult to flow in this invention, in contrast to conventional edible pigments, pigment bleeding hardly occurs because of using the particulate pigment of the vegetable dry powder.

Also, Patent Literature 2 (Japanese Patent Laid-Open No. 2008-143992) as described below relates to an ink for a writing instrument to transfer a pattern or the like on the surface of a food product such as a biscuit. Patent Literature 2 discloses that blocking which easily occurs during preservation is prevented by adding a polyglyceryl fatty acid ester, a vegetable hardened oil or the like to ink composition (containing an edible pigment). However, transferring to the food product can be carried out through pressure-sensitive transfer with a writing instrument such as a ball-point pen, and there is no description of transferring by heating. Furthermore, any combination of the components of the transfer layer of the present application is not described.

Patent Literature 3 (Japanese Patent Laid-Open No. 2000-139401) relates to manufacturing of a pigment transfer film that can be subjected to shirring, wherein an ink composition (containing an edible pigment) is improved to enhance flexibility. After printing, a conventional ink becomes brittle to easily peel off a film. In order to improve said transfer film, a protective layer is further provided via a buffer layer. This allows shirring to be performed easily, but there is no description about the prevention of pigment bleeding.

CITATION LIST

Patent Literature

[Patent Literature 1]
Japanese Patent Laid-Open No. 2005-137282
[Patent Literature 2]
[Patent Literature 2] Japanese Patent Laid-Open No. 2008-143992
[Patent Literature 3]
[Patent Literature 3] Japanese Patent Laid-Open No. 2000-139401

SUMMARY OF INVENTION

Technical Problem

An object of the present invention is to stably and efficiently dispose a water-soluble pigment layer such as a caramel on the surface of a processed meat food product such as roasted pork, a sausage, bacon or ham without any pigment bleeding/irregularity.

Means for Solving the Problems

The present invention provides a pigment transfer sheet for foods comprising a heat-resistant and water-resistant substrate and a transferable coloring layer disposed on the substrate, wherein the transfer coloring layer contains a water-soluble pigment as well as shellac and at least one binder.

Advantageous Effects of the Invention

By using the pigment transfer sheet for foods of the present invention, a water-soluble pigment is stably transferred on a surface during cooking a processed food product to easily provide a good coloring layer on the surface of a processed food product such as roasted pork, bacon, ham, a sausage, cheese or a processed marine product without any pigment bleeding/irregularity. The present pigment transfer sheet for foods greatly shortens a food processing step.

BRIEF DESCRIPTION OF THE DRAWINGS

FIG. 1 is a diagrammatic cross-sectional view illustrating one specific example of a pigment transfer sheet for foods according to the present invention.

DESCRIPTION OF EMBODIMENTS

In the pigment transfer sheet or film (hereinafter referred to merely as a sheet) according to the present invention, a transfer coloring layer 2 is disposed on the surface of a substrate 1 as illustrated in FIG. 1. This sheet will be described in further detail.

(1) Substrate

The substrate for the pigment transfer sheet for foods according to the present invention includes a sheet or a film with water resistance and heat resistance that does not melt or break down at around a cooking temperature. Also, it should not be toxic or generate any foreign odor in order to use it for a food product. Such a substrate encompasses: natural fibers such as vegetable fibers, animal fibers and mineral fibers; man-made fibers such as semisynthetic fibers (such as viscose and acetate) and synthetic fibers (such as polyesters and nylon); or papers spread by mixing them; nonwoven cloths; films or sheets formed of synthetic resins such as polyolefins, polyamides, polyesters (such as polyethylene terephthalate) by an extrusion method or an inflation method; paper-like articles produced by compressing foamed sheets of said synthetic resins; collagen and gelatinous sheet-like articles, and the like. The substrate may be a single-layer film thereof or a laminated film in which at least one layer is made from these materials.

Particularly preferable substrate layer includes films formed of synthetic resins such as polyolefins such as polyvinylidene chloride, polyethylene and polypropylene, polyamides and polyesters; woven cloths and nonwoven cloths comprising synthetic fibers such as polyester fibers and nylon fibers; or, for example, fibrous and cellulose natural polymer-based single-layer films or laminated films in which at least one layer is made from these materials, or substrates in which paper is impregnated or coated with viscose.

The substrate need not necessarily be permeable to air but when the substrate food is a material having a high water content, such as raw meat, the matrix web preferably has micropores, i.e. a sufficient degree of porosity to release the water vapor evolved in the course of cooking or sterilization. In contrast, when the substrate food is comparatively lean in water and melts at a temperature not exceeding 60 to 70° C., such as processed cheese, the matrix web is preferably nonporous in order that decreases in product yield may be avoided. Particularly preferable examples of the substrate having air permeability include a commercially available product in which paper mainly made from Manila hemp fiber is coated (impregnated) with viscose, "TOKKASHI" (Trade name; manufactured by Towa Kako Co., Ltd.). An innoxious heat-resistant film such as polyethylene terephthalate has no air permeability without being processed, but a number of micropores may also be formed therein by a needle, electrical discharge machining or the like to apply air permeability.

(2) Transfer Coloring Layer

A coloring layer containing a water-soluble pigment is disposed on the above substrate and transferred to the surface of a food product by cooking the food product. The coloring layer contains the water-soluble pigment and a predetermined binder.

(2a) Water-Soluble Pigment

Water-soluble pigments which are used in the present invention include edible pigments such as caramels, cacao pigments, beet pigments, safflower pigments, gardenia pigments, kaoliang pigments, onion pigments and tar-based pigments as natural pigments, particularly preferably the caramels. The above-mentioned tar-based pigments includes water-soluble edible pigments such as Yellow No. 4, Yellow No. 5, Blue No. 1, Blue No. 2, Red No. 3, Red No. 40, Red No. 102, Red No. 104, Red No. 105 and Red No. 106.

The content of the water-soluble pigment is 1-90 parts by weight, preferably 2-85 parts by weight, based on 100 parts by weight of the coloring layer.

(2b) Binder

Examples of binder include calcium carbonate, starches, silicon dioxide, eggshell calcium, shell calcium, titanium oxide and the like which have prescribed water absorptivity, hot-water resistance and solubility or dispersibility in ink. The calcium carbonate, silicon dioxide, eggshell calcium, shell calcium and titanium oxide used as the binder in accordance with the present invention are not particularly limited, and any commercially available known ingredients may be used. Preferred examples of the starches include any typical starches and modified starches (such as oxidized starch, etherified starch, esterified starch and cationized starch). The content of the binder is typically 0.04-60 parts by weight based on 100 parts by weight of the coloring layer. For example, the calcium carbonate is 0.08-60 parts by weight, preferably 10-40 parts by weight. The starch is 0.04-60 parts by weight, preferably 5-40 parts by weight.

(2c) Other Components

The coloring layer containing the water-soluble pigment and the binder may further include other components for, e.g., reinforcing the binder, if necessary. Such components include shellac, zein and the like. These components are typically blended at 10-98 parts by weight, preferably 20-45 parts by weight, based on 100 parts by weight of the coloring layer.

(3) Overcoat Layer

It is preferable to further dispose an overcoat layer on the above transfer coloring layer. When the coloring layer is transferred on a food product having much water, the color bleeding of the water-soluble pigment often occurs. The overcoat layer prevents the migration of water from the food product to the transfer coloring layer for a certain time, to enable a good transferring operation. The overcoat layers include edible coating agents such as shellac, methyl cellulose, alginic acid and salts thereof.

(Manufacturing Method)

The following is a method for manufacturing the food transfer sheet of the present invention.

First, a solution for forming the transfer coloring layer is prepared. The water-soluble pigment, the binder and a solvent (such as ethanol) are mixed using a known mixer (such as a mixer or a nanomill) to prepare a homogeneous printing ink. The ink is applied on a substrate 1 by known means such as a gravure printing machine and is dried to dispose a transfer coloring layer 2 with a dry thickness of 0.5-90 μm (see FIG. 1).

Separately, a material for an overcoat layer is prepared. A coating agent such as shellac is stirred and dissolved in a solvent such as ethanol (hereinafter referred to as alcohol) to prepare a homogeneous printing ink. This ink is applied on the transfer coloring layer 2 by known means such as a gravure printing machine and is dried to dispose an overcoat layer 3 with a dry thickness of 0.5 μm. A total thickness of the transfer coloring layer and overcoat layer of the resulting food transfer sheet is 1-100 μm, preferably 5-30 μm.

The pigment transfer sheet for foods according to the present invention is used in the form of a flat film or a tube so that a surface coated with a pigment layer is brought into contact with a meat product. A raw meat filled into a casing is cooked in a manner similar to conventional method so that the pigment transfer sheet for foods is closely adhered to the meat. The flat film may be formed by an edible adhesive. Such adhesives include pullulan, gum arabic, α-starch, soluble starch, gelatine, casein and salts thereof, chitosan, alginic acid and salts thereof.

EXAMPLES

The present invention is further illustrated by the following Examples and Comparative Examples.

Example 1

In 65 kg of alcohol, 10 kg of calcium carbonate was stirred and dispersed. Subsequently, after 25 kg of a caramel was added thereto as a water-soluble pigment, they were stirred and dispersed, and then mixed by a nanomill to produce a homogeneous printing ink. The ink was applied to cellophane by a gravure printing machine and was hot-air dried. A solution in which 5 kg of shellac was dissolved in 95 kg of alcohol was further applied thereon, and it was hot-air dried and wound off. It was formed into a sack shape with a folding diameter of 110 mm×a length of 230 mm so that the coating surface of this sheet was turned inward. This sack was filled with 300 g of seasoned meat. This meat was dried at a temperature of 90° C. and a humidity of 15% for 50 minutes, thereafter steamed at a temperature of 90° C. and 99% for 60 minutes, subsequently dried at a temperature of 90° C. and a humidity of 15% for 10 minutes and cooled at a temperature of 4° C. for 14 hours to provide roasted pork.

When the sheet was peeled from the resultant roasted pork, a pigment layer in the sheet was finely transferred to the surface of the roasted pork, and the roasted pork with a good appearance was thus produced.

Example 2

In 70 kg of alcohol, 5 kg of starch was stirred and dispersed. Subsequently, after 25 kg of a caramel was added thereto as a water-soluble pigment, they were stirred and dispersed, and then mixed by a nanomill to produce a homogeneous printing ink. The ink was applied to Manila hemp processed paper (cellulose coating) by a gravure printing machine and was hot-air dried. A solution in which 5 kg of shellac was dissolved in 95 kg of alcohol was further applied thereon, and it was hot-air dried and wound off. It was formed into a sack shape with a folding diameter of 110 mm×a length of 230 mm so that the coating surface of this sheet was turned inward. This sack was filled with 300 g of seasoned meat. This meat was dried at a temperature of 90° C. and a humidity of 15% for 50 minutes, thereafter steamed at a temperature of 90° C. and 99% for 60 minutes, subsequently dried at a temperature of 90° C. and a humidity of 15% for 10 minutes and cooled at a temperature of 4° C. for 14 hours to provide roasted pork.

When the sheet was peeled from the resultant roasted pork, a pigment layer in the sheet was finely transferred to the surface of the roasted pork, and the roasted pork with a good appearance was thus produced.

Example 3

In 70 kg of alcohol, 5 kg of silicon dioxide was stirred and dispersed. Subsequently, after 25 kg of a caramel was added thereto as a water-soluble pigment, they were stirred and dispersed, and then mixed by a nanomill to produce a homogeneous printing ink. The ink was applied to Manila hemp processed paper by a gravure printing machine and was hot-air dried. A solution in which 5 kg of shellac was dissolved in 95 kg of alcohol was further applied thereon, and it was hot-air dried and wound off. It was formed into a sack shape with a folding diameter of 110 mm×a length of 230 mm so that the coating surface of this sheet was turned inward. This sack was filled with 300 g of seasoned meat. This meat was dried at a temperature of 90° C. and a humidity of 15% for 50 minutes, thereafter steamed at a temperature of 90° C. and 99% for 60 minutes, subsequently dried at a temperature of 90° C. and a humidity of 15% for 10 minutes and cooled at a temperature of 4° C. for 14 hours to provide roasted pork.

When the sheet was peeled from the resultant roasted pork, a pigment layer in the sheet was finely transferred to the surface of the roasted pork, and the roasted pork with a good appearance was thus produced.

Example 4

In 60 kg of alcohol, 5 kg of shell calcium and 10 kg of shellac were stirred and dispersed. Subsequently, after 25 kg of a caramel was added thereto as a water-soluble pigment, they were stirred and dispersed, and then mixed by a nanomill to produce a homogeneous printing ink. The ink was applied to one polyethylene surface of a laminated film of polyethylene/nylon/polyethylene by a gravure printing machine and was hot-air dried. A solution in which 5 kg of shellac was dissolved in 95 kg of alcohol was further applied thereon, and it was hot-air dried and wound off. It was formed into a tube with a diameter of 40 mm×a length of 100 mm so that the coating surface of this sheet was turned inward. This tube was filled with 150 g of seasoned meat. This meat was boiled at a temperature of 80° C. for 45 minutes and thereafter cooled at a temperature of 4° C. for 14 hours to provide a sausage.

When the sheet was peeled from the resultant sausage, a pigment layer in the sheet was finely transferred to the surface of the sausage, and the sausage with a good appearance was thus produced.

Example 5

In 60 kg of alcohol, 5 kg of starch and 10 kg of shellac were stirred and dispersed. Subsequently, after 25 kg of a caramel was added thereto as a water-soluble pigment, they were stirred and dispersed, and then mixed by a nanomill to produce a homogeneous printing ink. The ink was applied to Manila hemp processed paper by a gravure printing machine and was hot-air dried. A solution in which 5 kg of shellac was dissolved in 95 kg of alcohol was further applied thereon, and it was hot-air dried and wound off. Seasoned ribs were wrapped with this sheet so that its coating surface was turned inward. The ribs were dried at a temperature of 60° C. and a humidity of 35% for 30 minutes and at a temperature of 65° C. and a humidity of 15% for 90 minutes, thereafter steamed at a temperature of 80° C. and 99% for 60 minutes, dried at a showering temperature of 50° C. for 2 minutes and subsequently at a temperature of 50° C. and a humidity of 15% for 5 minutes and cooled at a temperature of 4° C. for 14 hours to provide bacon.

When the sheet was peeled from the resultant bacon, a pigment layer in the sheet was finely transferred to the surface of the bacon, and the bacon with a good appearance was thus produced.

Example 6

In 58.92 kg of alcohol, 40 kg of shellac was stirred and dissolved, 0.08 kg of calcium carbonate was added, and they were stirred and dispersed. Subsequently, after 1 kg of a caramel was added thereto as a water-soluble pigment, they were stirred and dispersed, and then mixed by a nanomill to produce a homogeneous printing ink. The ink was applied to cellophane by a gravure printing machine and was hot-air dried. A solution in which 5 kg of shellac was dissolved in 95 kg of alcohol was further applied thereon, and it was hot-air dried and wound off. It was formed in a sack shape with a folding diameter of 110 mm×a length of 230 mm so that the coating surface of this sheet was turned inward. This sack was filled with 300 g of seasoned meat. This meat was dried at a temperature of 90° C. and a humidity of 15% for 50 minutes, thereafter steamed at a temperature of 90° C. and 99% for 60 minutes, subsequently dried at a temperature of 90° C. and a humidity of 15% for 10 minutes and cooled at a temperature of 4° C. for 14 hours to provide roasted pork.

When the sheet was peeled from the resultant roasted pork, a pigment layer in the sheet was finely transferred to the surface of the roasted pork, and the roasted pork with a good appearance was thus produced.

Example 7

In 68.96 kg of alcohol, 30 kg of shellac was stirred and dissolved, and after 0.04 kg of starch was added thereto, they were stirred and dispersed. Subsequently, after 1 kg of a caramel was added thereto as a water-soluble pigment, they were stirred and dispersed, and then mixed by a nanomill to produce a homogeneous printing ink. The ink was applied to cellophane by the gravure printing machine and was hot-air dried. A solution in which 5 kg of shellac was dissolved in 95 kg of alcohol was further applied thereon, and it was hot-air dried and wound off. It was formed into a sack shape with a folding diameter of 110 mm×a length of 230 mm so that the coating surface of this sheet was turned inward. This sack was filled with 300 g of seasoned meat. This meat was dried at a temperature of 90° C. and a humidity of 15% for 50 minutes, thereafter steamed at a temperature of 90° C. and 99% for 60 minutes, subsequently dried at a temperature of 90° C. and a humidity of 15% for 10 minutes and cooled at a temperature of 4° C. for 14 hours to provide roasted pork.

When the sheet was peeled from the resultant roasted pork, a pigment layer in the sheet was finely transferred to the surface of the roasted pork, and the roasted pork with a good appearance was thus produced.

Example 8

In 60 kg of alcohol, 10 kg of calcium carbonate and 5 kg of shellac were stirred and dispersed. Subsequently, after 25 kg of a caramel as a water-soluble pigment was added thereto, they were stirred and dispersed, and then mixed by a nanomill to produce a homogeneous printing ink. The ink was applied to a special nonwoven cloth for processing a food product by a gravure printing machine and was hot-air dried. This special nonwoven cloth is obtainable by making a nonwoven cloth comprising polyethylene and polyester with Japanese paper and further impregnating it with cellulose (see Japanese Patent No. 3,295,488). A solution in which 0.5 kg of sodium alginate was dissolved in alcohol water (89.5 kg water+10 kg alcohol) was further applied thereon, and it was hot-air dried and wound off.

It was formed into a tube with a diameter of 40 mm×a length of 100 mm so that the coating surface of this sheet was turned inward. This tube was filled with 150 g of seasoned meat, and it was boiled at a temperature of 80° C. for 45 minutes and thereafter cooled at a temperature of 4° C. for 14 hours to provide a sausage.

When the sheet was peeled from the resultant sausage, a pigment layer in the sheet was finely transferred to the surface of the sausage, and the sausage with a good appearance was thus produced.

Example 9

A printing ink was produced in the same manner as described in Example 8, and the ink was applied to a special nonwoven cloth and hot-air dried. A solution in which 2 kg of methyl cellulose was dissolved in alcohol water (88 kg water+10 kg alcohol) was further applied thereon, and it was hot-air dried and wound off.

Then, this sheet was processed and formed into a tube in the same manner as described in Example 8, and it was filled with seasoned meat and cooked to produce a sausage.

When the sheet was peeled from the resultant sausage, a pigment layer in the sheet was finely transferred to the surface of the sausage, and the sausage with a good appearance was thus produced.

Examples 10 to 12

Pigment transfer sheets were produced in the same manner as described in Example 1 except that instead of the caramels, a cacao pigment, a safflower pigment and a tar-based pigment: Red No. 3 were used as the water-soluble pigments (Examples 10 to 12). Roasted pork was cooked using them. The resultant products showed good appearances, in which pigment layers were finely transferred to the surfaces of the roasted pork.

Comparative Example 1

In 74.8 kg of alcohol, 0.2 kg of shellac was stirred and dissolved. After 25 kg of a caramel was added thereto as a water-soluble pigment, they were stirred and dispersed, and then mixed by a nanomill to produce a homogeneous printing ink. The ink was applied to Manila hemp processed paper by a gravure printing machine and was hot-air dried. A solution in which 5 kg of shellac was dissolved in 95 kg of alcohol was further applied thereon, and it was hot-air dried and wound off. It was formed into a sack shape with a folding diameter of 110 mm×a length of 230 mm so that the coating surface of this sheet was turned inward. This sack was filled with 300 g of seasoned meat. This meat was dried at a temperature of 90° C. and a humidity of 15% for 50 minutes, thereafter steamed at a temperature of 90° C. and a humidity of 99% for 60 minutes, subsequently dried at a temperature of 90° C. and a humidity of 15% for 10 minutes and cooled at a temperature of 4° C. for 14 hours to provide roasted pork.

When the sheet was peeled from the resultant roasted pork, a pigment layer in the sheet was eluted into water from the roasted pork and transferred in the state of pigmentation irregularities on the surface of the roasted pork, and the roasted pork with a poor appearance was thus produced.

During storage, the coating surface of the sheet in the sack shape absorbed moisture to show the state of the adherence of the inner surface.

Comparative Example 2

In 74.7 kg of alcohol, 0.3 kg of shellac was dispersed and stirred for 60 minutes to be dissolved. After 25 kg of a caramel was added thereto as a water-soluble pigment, they were stirred and dispersed, and then mixed by a nanomill to produce a homogeneous printing ink. The ink was applied to cellophane by a gravure printing machine and was hot-air dried. A solution in which 5 kg of shellac was dissolved in 95 kg of alcohol was further applied thereon, and it was hot-air dried and wound off. It was formed into a sack shape with a folding diameter of 110 mm×a length of 230 mm so that the coating surface of this sheet was turned inward. This sack was filled with 300 g of seasoned meat. This meat was dried at a temperature of 90° C. and a humidity of 15% for 50 minutes, thereafter steamed at a temperature of 90° C. and a humidity of 99% for 60 minutes, subsequently dried at a temperature of 90° C. and a humidity of 15% for 10 minutes and cooled at a temperature of 4° C. for 14 hours to provide roasted pork.

When the sheet was peeled from the resultant roasted pork, a pigment layer in the sheet was eluted into water from the roasted pork and transferred in the state of pigmentation irregularities on the surface of the roasted pork, and the roasted pork with a poor appearance was thus produced.

During storage, the coating surface of the sheet in the sack shape absorbed moisture to show the state of the adherence of the inner surface.

Comparative Example 3

In 28.6 kg of alcohol, 0.4 kg of shellac was dispersed and stirred for 60 minutes to be dissolved. After 71 kg of a caramel was added thereto as a water-soluble pigment, they were stirred and dispersed, and then mixed by a nanomill to produce a homogeneous printing ink. The ink was applied to one polyethylene surface of a laminated film of polyethylene/nylon/polyethylene by a gravure printing machine and was hot-air dried. It was formed into a tube with a diameter of 40 mm×a length of 100 mm so that the coating surface of this sheet was turned inward. This tube was filled with 150 g of seasoned meat. This meat was boiled at a temperature of 80° C. for 45 minutes and thereafter cooled at a temperature of 4° C. for 14 hours to provide a sausage. When the sheet was peeled from the resultant sausage, a pigment layer in the sheet was eluted into water from the sausage and transferred in the state of pigmentation irregularities on the surface of the sausage, and the sausage with a poor appearance was thus produced.

During storage, the coating surface of the sheet in the sack shape absorbed moisture to show the state of the adherence of the inner surface.

Comparative Example 4

In 70 kg of alcohol, 5 kg of shellac was stirred and dispersed. Subsequently, after 25 kg of a caramel as a water-soluble pigment was added thereto, they were stirred and dispersed, and then mixed by a nanomill to produce a homogeneous printing ink. The ink was applied to the aforementioned special nonwoven cloth by a gravure printing machine and was hot-air dried. A solution in which 0.5 kg of sodium alginate was dissolved in alcohol water (89.5 kg water+10 kg alcohol) was further applied thereon, and it was hot-air dried and wound off. It was formed into a tube with a diameter of 40 mm×a length of 100 mm so that the coating surface of this sheet was turned inward. This tube was filled with 150 g of seasoned meat. This meat was boiled at a temperature of 80° C. for 45 minutes and thereafter cooled at a temperature of 4° C. for 14 hours to provide a sausage.

When the sheet was peeled from the resultant sausage, a pigment layer in the sheet was eluted with water from the sausage and transferred in the state of pigmentation irregularities on the surface of the sausage, and the sausage with a poor appearance was thus produced.

During storage, the coating surface of the sheet in the sack shape absorbed moisture to show the state of the adherence of the inner surface.

Comparative Example 5

In 70 kg of alcohol, 5 kg of shellac was stirred and dispersed. Subsequently, after 25 kg of a caramel was added thereto as a water-soluble pigment, they were stirred and dispersed, and then mixed by a nanomill to produce a homogeneous printing ink. The ink was applied to the aforementioned special nonwoven cloth by a gravure printing machine and was hot-air dried. A solution in which 2 kg of methyl cellulose was dissolved in alcohol water (88 kg water+10 kg alcohol) was further applied thereon, and it was hot-air dried and wound off. It was formed into a tube with a diameter of 40 mm×a length of 100 mm so that the coating surface of this sheet was turned inward. This tube was filled with 150 g of seasoned meat. This meat was boiled at a temperature of 80° C. for 45 minutes and thereafter cooled at a temperature of 4° C. for 14 hours to provide a sausage.

When the sheet was peeled from the resultant sausage, a pigment layer in the sheet was eluted with water from the sausage and transferred in the state of pigmentation irregularities on the surface of the sausage, and the sausage with a poor appearance was thus produced.

During storage, the coating surface of the sheet in the sack shape absorbed moisture to show the state of the adherence of the inner surface.

[Evaluation of Transfer Treatment]

After heat-cooking step of a raw meat packaged in the transfer sheets as described above, the evaluations of transfer treatment were carried out with respect to blocking of the printed sheets, pigment displacements in the filling of the meat, pigment bleeding after the cooking and transfer properties, by the following criteria. Comprehensive judgment of the above results brought the evaluations of the superiority or inferiority of the transfer treatment to meats.

(a) Blocking of Printed Sheet
  ○: No blocking
  X: Blocking
(b) Pigment Displacement in Filling of Meat
  ○: No displacement occurred in a coloring layer when filling meat.
  X: A displacement occurred in a coloring layer when filling meat.
(c) Pigment Bleeding after Cooking
  ○: No pigment bleeding of a coloring layer occurred on a meat surface when peeling a sheet after cooking.
  X: Pigment bleeding of a coloring layer occurred on a meat surface when peeling a sheet after cooking.
(d) Transfer Appropriateness
  ○: Homogeneously transfer occurred on a meat surface.
  X: A displacement occurred in a coloring layer on a meat surface, patchy transfer occurred, or poor transfer occurred.

The following table shows the test results thereof.

|  |  |  | Example | | | | | | | | | Comparative Example | | | | |
|---|---|---|---|---|---|---|---|---|---|---|---|---|---|---|---|---|
|  |  |  | 1 | 2 | 3 | 4 | 5 | 6 | 7 | 8 | 9 | 1 | 2 | 3 | 4 | 5 |
| Transfer coloring layer | Caramel | | 25 | 25 | 25 | 25 | 25 | 1 | 1 | 25 | 25 | 25 | 25 | 71 | 25 | 25 |
|  | Binder | Calcium carbonate | 10 |  |  |  | 0.08 |  |  | 10 | 10 |  |  |  |  |  |
|  |  | Starch |  |  | 5 |  | 5 |  | 0.04 |  |  |  |  |  |  |  |
|  |  | Silicon dioxide |  |  |  | 5 |  |  |  |  |  |  |  |  |  |  |
|  |  | Shell calcium |  |  |  |  | 5 |  |  |  |  |  |  |  |  |  |
|  | Shellac |  |  |  |  | 10 | 10 | 40 | 30 | 5 | 5 | 0.2 | 0.3 | 0.4 | 5 | 5 |
|  | Alcohol |  | 65 | 70 | 70 | 60 | 60 | 58.92 | 68.96 | 60 | 60 | 74.8 | 74.7 | 28.6 | 70 | 70 |

-continued

|  |  | Example | | | | | | | | | Comparative Example | | | | |
|---|---|---|---|---|---|---|---|---|---|---|---|---|---|---|---|
|  |  | 1 | 2 | 3 | 4 | 5 | 6 | 7 | 8 | 9 | 1 | 2 | 3 | 4 | 5 |
| Overcoat layer | Shellac | 5 | 5 | 5 | 5 | 5 | 5 | 5 |  |  |  |  |  |  |  |
|  | Sodium alginate |  |  |  |  |  |  |  | 0.5 |  |  |  |  | 0.05 |  |
|  | Methyl cellulose |  |  |  |  |  |  |  |  | 2 |  |  |  |  | 0.5 |
|  | Alcohol | 95 | 95 | 95 | 95 | 95 | 95 | 95 | 10 | 10 |  |  |  | 10 | 10 |
|  | Water |  |  |  |  |  |  |  | 89.5 | 88 |  |  |  | 89.95 | 89.5 |
| Evaluation | Blocking of sheet | ○ | ○ | ○ | ○ | ○ | ○ | ○ | ○ | ○ | x | x | x | x | x |
|  | Pigment displacement in filling of meat | ○ | ○ | ○ | ○ | ○ | ○ | ○ | ○ | ○ | x | x | x | x | x |
|  | Pigment bleeding after cooking | ○ | ○ | ○ | ○ | ○ | ○ | ○ | ○ | ○ | x | x | x | x | x |
|  | Transfer appropriateness | ○ | ○ | ○ | ○ | ○ | ○ | ○ | ○ | ○ | x | x | x | x | x |

A blending rate is shown by part(s) by weight based on 100 parts by weight of a coloring layer (solid content).

INDUSTRIAL APPLICABILITY

By using the transfer sheet for foods according to the present invention, a pigment layer is transferred stably and efficiently to the surfaces of various processed food products such as ham, sausages and cheese without any pigment bleeding/irregularity, and therefore a food processing step is greatly shortened.

REFERENCE SIGNS LIST

1 Substrate
2 Transfer coloring layer
3 Overcoat layer

The invention claimed is:

1. A pigment transfer sheet for foods comprising
a heat-resistant and water-resistant substrate;
an edible transfer coloring layer applied on the substrate; and
an overcoat layer applied on the transfer coloring layer,
wherein the transfer coloring layer is transferable, as a whole, during heat cooking and comprises a water-soluble pigment and at least one binder selected from the group consisting of calcium carbonate, starches, eggshell calcium, shell calcium and titanium oxide,
wherein the overcoat layer comprises methyl cellulose, alginic acid or a salt thereof.

2. The pigment transfer sheet for foods according to claim 1, wherein the water-soluble pigment is at least one pigment selected from a caramel, a cacao pigment, a beet pigment, a safflower pigment, a gardenia pigment, a kaoliang pigment and an onion pigment.

3. The pigment transfer sheet for foods according to claim 1, wherein the pigment transfer sheet for foods comprises 1-90 parts by weight of the water-soluble pigment and 0.08-60 parts by weight of the calcium carbonate, and/or 0.04-60 parts by weight of the starch, based on the total amount of 100 parts by weight of a transfer coloring layer.

4. The pigment transfer sheet for foods according to claim 1, wherein the substrate is a film formed of a synthetic resin; a woven or nonwoven cloth comprising a synthetic fiber; a natural polymer-based single-layer film; or a laminated film in which at least one layer is made from these materials; or a substrate in which paper is impregnated or coated with viscose.

* * * * *